March 15, 1932. L. O. GRANGE 1,849,229
BEAD PLATE
Filed April 26, 1930
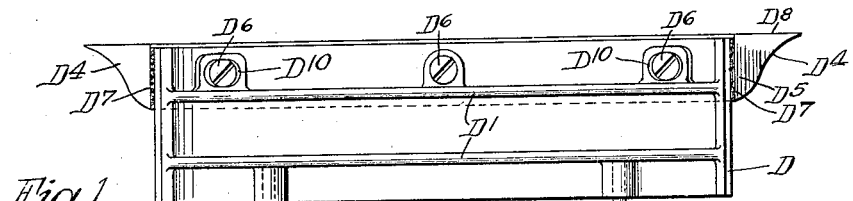
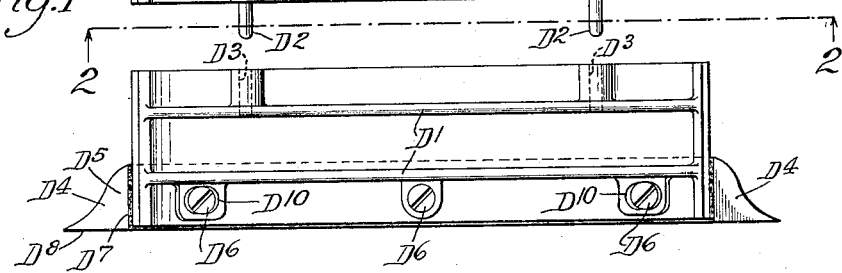
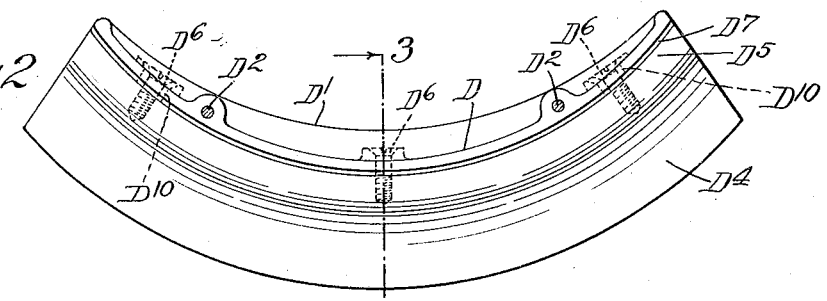
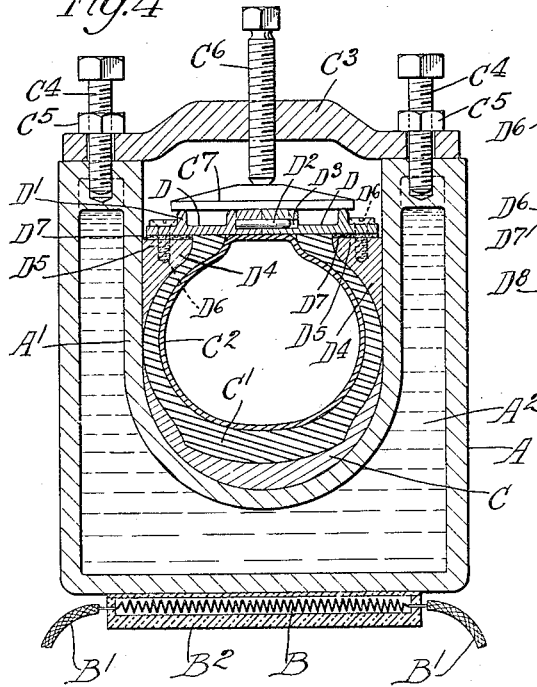
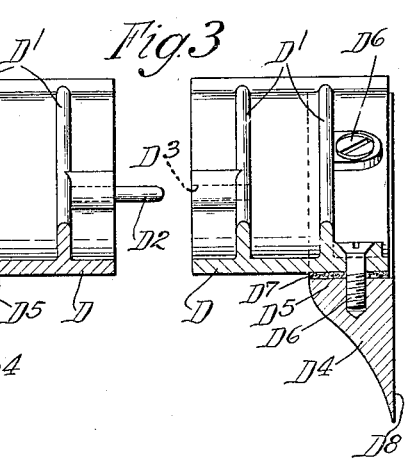
Inventor
Leo O. Grange
by Parker & Carter
Attorneys.

Patented Mar. 15, 1932

1,849,229

UNITED STATES PATENT OFFICE

LEO O. GRANGE, OF CHICAGO, ILLINOIS, ASSIGNOR TO WALTER J. JARRATT, OF CHICAGO, ILLINOIS

BEAD PLATE

Application filed April 26, 1930. Serial No. 447,540.

My invention relates generally to vulcanizing devices and has for one particular application the provision of a bead plate applicable for use with vulcanizing devices for vulcanizing tire casings. One object is the provision of such a plate which shall be strong and light, and which shall minimize the loss of heat through the plate. Another object is the provision of a bead plate the most perishable portion of which shall be separately renewable. Other objects will appear from time to time in the course of the specification and claims.

I illustrate my invention more or less diagrammatically in the accompanying drawings, wherein—

Figure 1 is a plan view;

Figure 2 is a section on the line 2—2 of Figure 1;

Figure 3 is a section on the line 3—3 of Figure 2; and

Figure 4 is a transverse section illustrating the bead plate in use.

Like parts are indicated by like symbols throughout the specification and drawings.

Referring to the drawings, A generally indicates any suitable housing associated with which is the inner member or form wall $A^1$. The space between the walls A and $A^1$ may be filled for example by a liquid $A^2$. I may for example employ a liquid the boiling point of which is higher than the temperature to which the liquid is subjected, and higher than the temperature necessary for vulcanizing, whereby risk of explosion is avoided.

B indicates any suitable means, herein shown as an electric resistance for applying heat to the liquid $A^2$. $B^1$ indicates the actuating circuit and $B^2$ any suitable electric and heat insulating means surrounding the coil.

Positioned within the cavity of the wall $A^1$ is any suitable shell or form C, conforming to the tread of the tire to be treated. $C^1$ indicates a tire in course of treatment and $C^2$ any suitable inner pack tube or filler, adapted to maintain the casing in inflated condition during treatment, and in close contact with the inner surface of the member C. $C^3$ indicates any suitable clamp secured to the member A for example by the bolts $C^4$ with the lock nuts $C^5$. $C^6$ indicates a pressure member or screw, screwthreaded through the yoke $C^3$ and in association with a pressure applying plate $C^7$.

Interposed between the casing $C^1$ and the pressure plate $C^7$ is the bead plate which forms the subject matter of the present application. The plate is formed in two halves, as shown in Figures 1 and 3, each section including a top plate portion generally indicated as D with the flanges $D^1$ upwardly projecting from the upper surface thereof. In order that the two sections may mate I may provide pins $D^2$ adapted to penetrate apertures $D^3$. $D^4$ $D^4$ are the bead engaging members proper, each having a broad upper portion $D^5$ which may be secured to the bottom of the plate D, as by the screws $D^6$. It will be seen from Figures 3 and 4 that the heat insulating layer or member $D^7$ is interposed between D and $D^5$. It will also be seen that the flat outer side $D^8$ of the member D, which engages the inner face of the upper portion of the cavity $A^1$, extends outwardly somewhat beyond the edge of the plate D. It will thus be seen that the plate D is entirely out of contact with the wall $A^1$. It will be observed, as in Figures 1 and 2, that the screws $D^6$ pass through elongated apertures or slots $D^{10}$, to permit relative expansion of the parts.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

For example it will be understood that whereas I have shown pins $D^2$ mating in apertures $D^3$ to secure the two halves together, I may employ any other suitable securing means, or may, if desired, employ one whole instead of two halves, and do not wish to be limited specifically to the employment of two halves.

The use and operation of my invention are as follows:

In vulcanizing tire casings it is important that the heat be applied to the part to be vulcanized, and that the loss of heat be reduced to a minimum. This is important, since a substantial proportion of the cost of such vulcanizing operation is the cost of the power consumed. Also, a conservation of heat makes for a more rapid vulcanization, thus increasing the total output or capacity of a vulcanizing device, a fact of importance in a busy plant. In order to reduce the loss through the bead plate to a minimum I divide the bead plate into the upper portion D and the lower portion $D^4$. The upper portion D has no heating function and merely serves to draw off heat from the heating portion $D^4$, which does apply heat adjacent the bead of the tire, in some cases. In other words, where the tread only is being treated, the bead plate itself may have either merely a secondary heating function, or no heating function at all. In either case it is important to limit the transfer or escape of heat from the wall $A^1$ through the bead plate and through the clamping means. Hence the importance of insulating the portion $D^4$ $D^5$ of the bead plate from the plate proper D. For the same reason, and to effect the escape of heat through the plate D, the plate D itself is so formed or so positioned in relation to the member $D^4$ $D^5$ as to avoid contact with the wall $A^1$. This will be clear from Figures 3 and 4. Further, to prevent the transmission of heat from the plate D to the clamping means, and also, to lighten the plate and save metal, I employ the upwardly projecting abutment and reinforcing flanges $D^1$. It will be seen, as in Figure 4, that the pressure applying plate $C^7$ does not engage the plate D proper, but only the upper edges, rounded off at that, of the flanges $D^1$. Thus the transfer of heat through and from the plate D is reduced to a minimum.

A further advantage in employing the plate of separable portions, rests in the fact that while the upper plate portion D has an almost indefinite life, the sharp edge of the portion $D^4$ is easily broken, battered and bent. When the edge is badly chipped or broken, the bead plate becomes unusable. Were the bead plate formed as a unit, it would then be necessary to throw away the entire plate. In employing my invention, only the portion $D^4$ $D^5$ need be thrown away, and a corresponding new member can be quickly and easily applied. The result is a very substantial saving to the operator.

The fuel saving feature, resulting from the reduction of heat losses, becomes particularly important in connection with wide cavity vulcanizers, as for large bus tires. It will be understood that the bead plate is applicable to vulcanizers in which a fuel is used, as well as to those in which electricity is employed, and I do not wish to be limited to its use with any particular heating means.

I claim:

1. For use with a vulcanizer for tire casings, a bead plate which includes a side element adapted to engage the exterior of the casing adjacent the bead, a top element adapted for the application of pressure to the casing, said elements being separable, means for securing them together, and heat insulating means interposed between them.

2. The structure of claim 1 characterized in that the edge of that portion of the top element which overlies the side element is set back from the outer edge of the side element.

3. The structure of claim 1 characterized in that the top element includes a lower relatively thin portion, and a plurality of flanges upstanding therefrom.

Signed at Chicago, county of Cook, and State of Illinois, this 17th day of April, 1930.

LEO O. GRANGE.